United States Patent
Jones et al.

(10) Patent No.: US 11,664,921 B2
(45) Date of Patent: May 30, 2023

(54) RAPID NODE INSERTION INTO OR REMOVAL FROM A PHOTONIC NETWORK

(71) Applicant: Ciena Corporation, Hanover, MD (US)

(72) Inventors: Kevan Peter Jones, Ottawa (CA); Vipul Bhatnagar, Kensington, MD (US); Ross Caird, Kanata (CA); Bruno Doyle, Ottawa (CA); Marco Gaudet, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/519,149

(22) Filed: Nov. 4, 2021

(65) Prior Publication Data
US 2023/0136513 A1 May 4, 2023

(51) Int. Cl.
H04J 14/02 (2006.01)
H04B 10/25 (2013.01)
(52) U.S. Cl.
CPC .......... *H04J 14/0202* (2013.01); *H04B 10/25* (2013.01)
(58) Field of Classification Search
None
See application file for complete search history.

(56) References Cited

U.S. PATENT DOCUMENTS

| | | |
|---|---|---|
| 5,485,299 A | 1/1996 | Jones |
| 6,208,441 B1 | 3/2001 | Jones et al. |
| 6,351,322 B1 | 2/2002 | Ransford et al. |
| 6,532,087 B1 | 3/2003 | Ransford et al. |
| 6,542,233 B1 | 4/2003 | Bray et al. |
| 6,621,621 B1 | 9/2003 | Jones et al. |
| 6,646,795 B1 | 11/2003 | Jones et al. |
| 6,765,659 B1 | 7/2004 | Bhatnagar et al. |
| 6,795,607 B1 | 9/2004 | Archambault et al. |
| 6,842,868 B1 | 1/2005 | Brown et al. |
| 7,054,562 B1 | 5/2006 | Balakrishnan et al. |
| 7,075,711 B2 | 7/2006 | Haggans et al. |

(Continued)

FOREIGN PATENT DOCUMENTS

| | | |
|---|---|---|
| EP | 0 868 794 A1 | 10/1998 |
| EP | 1 063 545 A1 | 12/2000 |

(Continued)

*Primary Examiner* — Darren E Wolf
(74) *Attorney, Agent, or Firm* — Baratta Law PLLC; Lawrence A. Baratta, Jr.

(57) ABSTRACT

Systems and methods for strategizing the insertion and/or removal of a node into and/or out of a network are provided. A system, according to one implementation, includes a processing device and a memory device configured to store a computer program. The computer program includes instructions that, when executed, enable the processing device to configure a Network Element (NE) in a pass-through mode whereby channels are neither added nor dropped to thereby prepare the NE for insertion into or removal from a photonic network. Upon the insertion of the NE into the photonic network or the removal of the NE from the photonic network, the instructions may further enable the processing device to perform a zero configuration procedure for automatically establishing communication along one or more Optical Service Channels (OSCs) and for automatically controlling gain and loss characteristics along one or more fiber links altered by the insertion or removal.

19 Claims, 7 Drawing Sheets

(56) References Cited

U.S. PATENT DOCUMENTS

| | | | |
|---|---|---|---|
| 7,343,096 | B1 | 3/2008 | Bhatnagar et al. |
| 7,512,343 | B2 | 3/2009 | Sridhar |
| 8,526,812 | B2 | 9/2013 | Solheim et al. |
| 8,667,374 | B2 | 3/2014 | Watford et al. |
| 8,670,664 | B2 | 3/2014 | Leclair et al. |
| 8,761,602 | B2 | 6/2014 | Caird et al. |
| 8,787,147 | B2 | 7/2014 | Caird et al. |
| 8,811,822 | B2 | 8/2014 | Leclair et al. |
| 10,027,435 | B2 | 7/2018 | Guy et al. |
| 10,063,313 | B1 | 8/2018 | Al Sayeed et al. |
| 10,368,149 | B2 | 7/2019 | Jones et al. |
| 10,615,867 | B1 | 4/2020 | Bhatnagar et al. |
| 10,644,824 | B1 | 5/2020 | Grammel et al. |
| 10,826,601 | B2 | 11/2020 | Bhatnagar et al. |
| 11,055,155 | B2 | 7/2021 | Prakash et al. |
| 11,063,683 | B1 | 7/2021 | Jones et al. |
| 2001/0051019 | A1* | 12/2001 | Bailey ................ G02B 6/29395 385/24 |
| 2003/0151799 | A1 | 8/2003 | Wight et al. |
| 2003/0185563 | A1* | 10/2003 | Stephens ............ H04B 10/296 359/25 |
| 2004/0028406 | A1* | 2/2004 | Bortz ................. H04Q 11/0005 398/49 |
| 2004/0052526 | A1 | 3/2004 | Jones et al. |
| 2004/0100684 | A1 | 5/2004 | Jones et al. |
| 2004/0130778 | A1* | 7/2004 | Smith ................ H04B 10/2935 359/337 |
| 2004/0208504 | A1 | 10/2004 | Solheim et al. |
| 2005/0008372 | A1* | 1/2005 | Hochbaum ........ H04Q 11/0067 398/140 |
| 2005/0283815 | A1* | 12/2005 | Brooks ................ H04H 20/78 725/127 |
| 2008/0201112 | A1* | 8/2008 | Bouchard ............ G06F 30/00 703/1 |
| 2008/0212167 | A1 | 9/2008 | Van Schyndel et al. |
| 2008/0292313 | A1* | 11/2008 | Mahony ............ H04Q 11/0067 398/52 |
| 2008/0304834 | A1* | 12/2008 | Fan ..................... H04J 3/1694 398/137 |
| 2009/0175620 | A1 | 7/2009 | Bhatnagar et al. |
| 2011/0211835 | A1 | 9/2011 | Jones et al. |
| 2011/0211836 | A1 | 9/2011 | Leclair et al. |
| 2013/0016628 | A1* | 1/2013 | Bertani ................ H04L 41/046 370/255 |
| 2014/0126912 | A1 | 5/2014 | Bhatnagar |
| 2017/0122812 | A1 | 5/2017 | Bhatnagar et al. |
| 2019/0260671 | A1 | 8/2019 | Caird et al. |
| 2019/0349262 | A1 | 11/2019 | Miedema et al. |
| 2020/0371295 | A1 | 11/2020 | Jones et al. |
| 2020/0374025 | A1 | 11/2020 | Jones et al. |
| 2021/0042172 | A1 | 2/2021 | Miedema et al. |
| 2021/0075877 | A1 | 3/2021 | Miedema et al. |
| 2021/0226408 | A1 | 7/2021 | Boertjes et al. |

FOREIGN PATENT DOCUMENTS

| | | |
|---|---|---|
| EP | 0 842 574 B1 | 4/2002 |
| EP | 1 278 324 A2 | 1/2003 |
| EP | 1 017 140 A3 | 7/2003 |
| EP | 2 993 807 B1 | 1/2018 |
| EP | 3 062 462 B1 | 4/2019 |
| EP | 3 462 643 A2 | 4/2019 |
| EP | 3 462 693 A1 | 4/2019 |

* cited by examiner

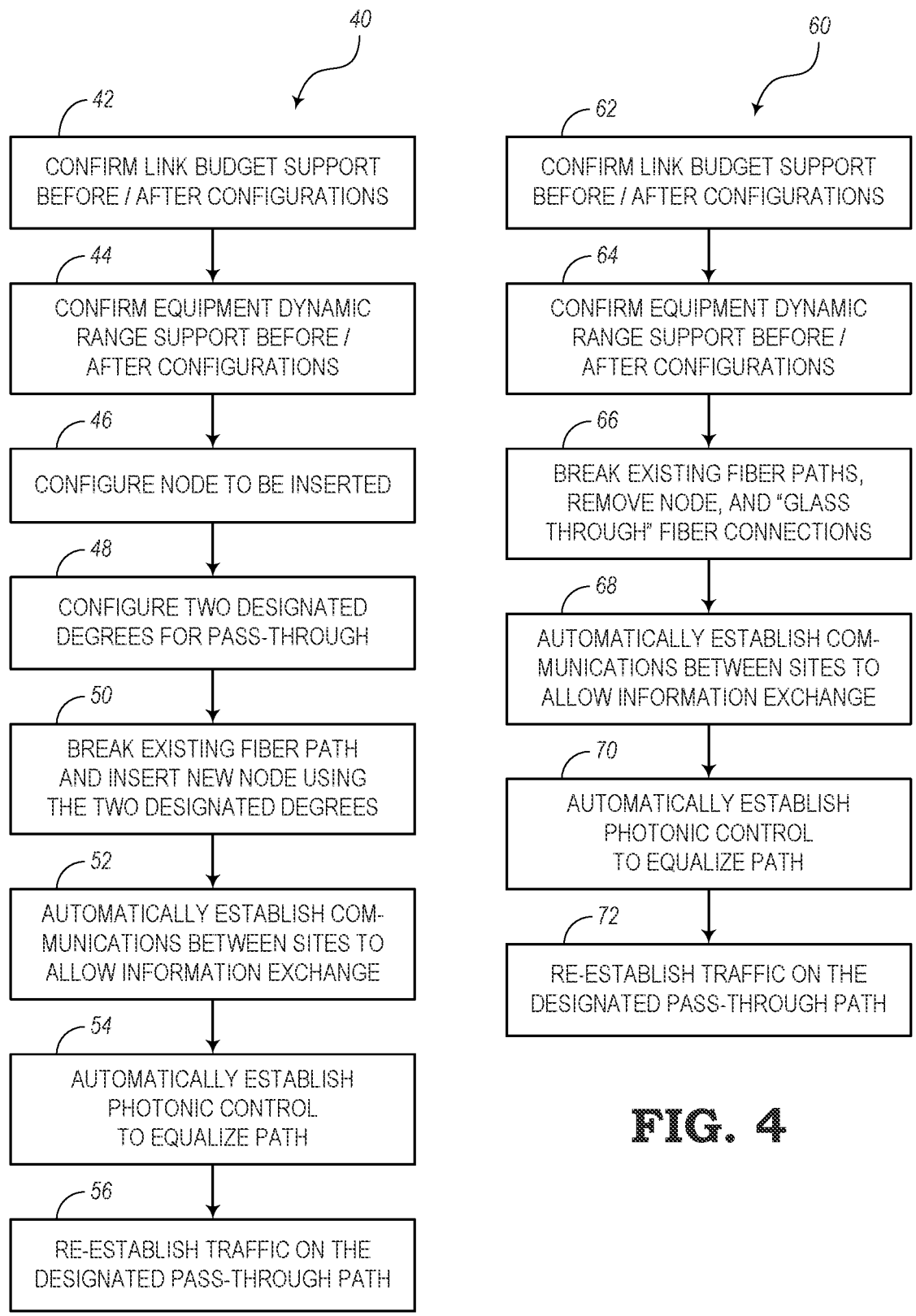

RAPID NODE INSERTION INTO OR REMOVAL FROM A PHOTONIC NETWORK

TECHNICAL FIELD

The present disclosure generally relates to networking systems and methods. More particularly, the present disclosure relates to adding or removing a node into or out of a photonic network in a way that minimizes network downtime.

BACKGROUND

Node insertion and removal procedures typically require many steps, which can create many opportunities for errors and can increase the outage time for network reconfiguration. These insertion/removal events are normally performed during off-peak maintenance windows to minimize the impact on customers.

Existing solutions use a combination of manual provisioning, scripting, and other procedures to allow a network operator or technician to manage the insertion/removal processes. On the other hand, more automated solutions may use an external network management system to automate the process to some extent, but connection to such management systems may not always be available.

In the known solutions, there are many opportunities for errors and delays. Since conventional systems are generally slow and error prone, network operators are usually very cautious to undertake any measures related to node insertion/removal. However, there can be great value in being able to optimize a network by inserting and removing nodes as needed. Thus, allowing the flexibility to manage the deployment of new nodes in a network and the removal of nodes that are no longer useful can be a significant benefit for service providers in order to optimize how services are provided to customers.

Therefore, there is a need in the field of network topology planning to allow the insertion and/or removal of nodes in a way that is rapid and does not create a large amount of downtime for customers. Also, there is a need to perform the insertion or removal tasks with little or no node-configuring procedures on the part of the network operators so as to reduce human error.

BRIEF SUMMARY

The present disclosure is directed to systems and methods for inserting nodes into a network or removing nodes from a network. A process may generally include a step of configuring a Network Element (NE) (or node) in a pass-through mode whereby channels are neither added nor dropped to thereby prepare the NE for insertion into or removal from a photonic network. For example, after the NE is prepared for insertion or removal by configuring the NE in the pass-through mode, additional steps, according to optional implementations, may be performed.

For example, upon the insertion of the NE into the photonic network or the removal of the NE from the photonic network, the process may further include the step of performing a zero configuration procedure for automatically establishing communication along one or more Optical Service Channels (OSCs). Upon the insertion of the NE into the photonic network or the removal of the NE from the photonic network, the process may additionally include the step of performing a zero configuration procedure for automatically controlling gain and loss characteristics along one or more fiber links altered by the insertion or removal.

In some embodiments, the process may include the step of instructing a technician to a) break a fiber connection between two peer nodes in the photonic network, b) perform the insertion of the NE between the two peer nodes in the photonic network, and c) re-establish the one or more fiber connections with the NE for enabling direct communication between the NE and each of the two peer nodes.

It may be noted that this NE may be a Reconfigurable Optical Add/Drop Multiplexer (ROADM). In other embodiments, the NE may be a Fixed Optical Add/Drop Multiplexer (FOADM), whereby the pass-through condition may allow one or more channels, which are not already preconfigured for the channel adding operation or the channel dropping operation, to pass signals through with neither the channel adding operation nor the channel dropping operation.

After the insertion of the NE into the photonic network, the process, according to some embodiments, may further include the step of provisioning the NE for adding and/or dropping one or more channels. The step of configuring the NE in the pass-through condition may include preparing the NE for two-degree insertion into or two-degree removal from the photonic network. Also, the process may further include the step of checking for sufficient support of a link budget of channels in the photonic network before and after the insertion of the NE into the photonic network or the removal of the NE from the photonic network.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 3 is a flow diagram illustrating a process for inserting a node into a network, according to various embodiments.

FIG. 4 is a flow diagram illustrating a process for removing a node from a network, according to various embodiments.

DETAILED DESCRIPTION

Figure 1:
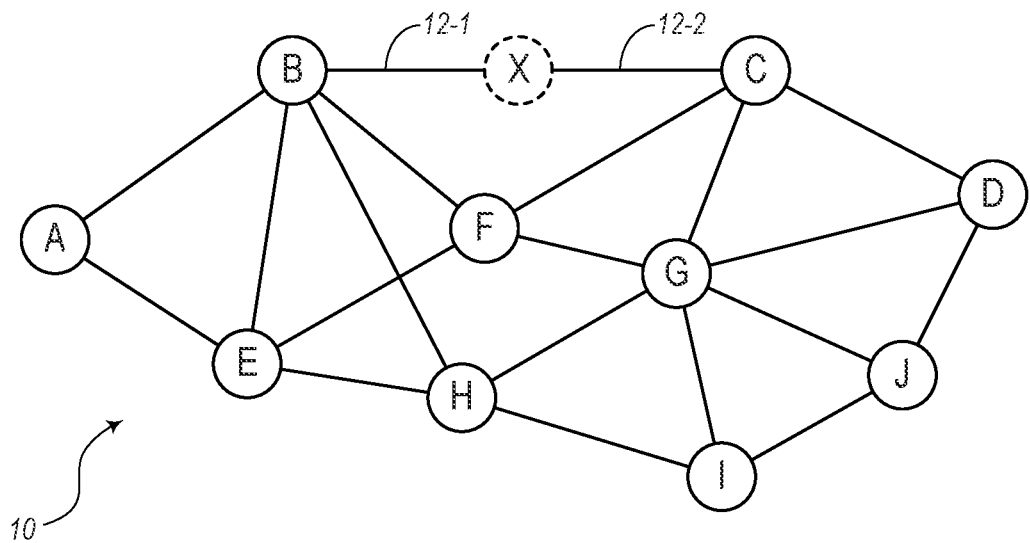
FIG. 1 is a diagram illustrating a network having multiple nodes, according to various embodiments.

The present disclosure relates to systems and methods for enabling a rapid node insertion or node removal process for inserting or removing one or more nodes into or out of a network (e.g., a photonic or optical network). According to conventional strategies, node insertion/removal usually includes "blocking" all optical channels. As such, when a node is first inserted (or about to be removed), the traffic flow is stopped along a certain path, which, of course, is not a desirable situation. Then, the conventional strategies include allowing a network operator to provision the channels manually to get the node up and running. On the other hand, the insertion/removal processes described in the present disclosure do not block the optical channel, but instead include the opposite. The embodiments of the present disclosure include allowing all channels to be open, which is referred to herein as a pass-through state where all traffic is passed through the node. Thus, a node in the pass-through state may have the appearance of a simple fiber, or perhaps an amplifier (e.g., Intermediate Line Amplifier (ILA), etc.). In the pass-through condition, there is neither channel adding nor channel dropping, but all optical channels are allowed to pass. After the insertion of a pass-through node, the node can then be configured to add or drop channels as needed for normal operation. As such, the network downtime in the techniques described in the present disclosure will be shorter than the conventional strategies.

The rapid insert methods of the present disclosure are configured to leverage pre-provisioning and automated discovery and control to reduce the user operations to merely disconnecting and reconnecting the optical fibers. This may include automated traffic recovery of the altered path to allow the insert/removal in a much faster time and with fewer errors. Also, since the embodiments of the present disclosure use only minimal pre-configuring steps and do not require an external management system, the automated node insertion/removal techniques of the present disclosure are more reliable than the conventional systems.

One of the key aspects of the present disclosure is the default photonic pass configuration for the added node to provide a pass-through express function. Again, this is not normally the case with respect to conventional systems, particularly in programmable photonic networks that includes Reconfigurable Optical Add/Drop Multiplexers (ROADMs). Another key aspect of the present disclosure is that the system may be used to enable a zero-configuration (zero-config) communications solution (e.g., using an Optical Service Channel (OSC)) and a zero-config photonic control application that defaults to an enabled operational state. Some of these zero-config solutions may include Zero Touch Provisioning (ZTP). The combination and sequencing of the pass-through configuration and zero-config processes are configured to facilitate a rapid automation process for node insertion and/or removal.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Photonic Network

FIG. 1 is a diagram illustrating an example of a network 10 or a portion of a network (e.g., photonic network). For example, the network 10 may be any type of optical network, such as a campus network, access network, metro network, regional network, long haul network, etc. The network 10 include multiple existing nodes, labelled A through J, arranged in any suitable network topology. Suppose, for example, that it is determined that a new node (Node X) is planned to be inserted in the network 10, such as between Nodes B and C. After insertion, a single link (e.g., fiber path) between Nodes B and C may include two links 12-1 and 12-2, as shown. According to another example, suppose Node X already exists in the network 10 and this node is planned for removal from the network 10. In this case, after removal, the links 12-1, 12-2 can be joined together to form a single link between Nodes B and C.

In either one the insertion or removal cases (i.e., Node X being added or removed), Node X is pre-configured in a pass-through state before the actual physical insertion or removal into or from the network 10. Thus, if inserted, Node X may simply appear as part of the link 12-1, 12-2 (e.g., as glass-through), such as a part of the link (or fiber) itself or part of an amplifier between Nodes B and C. In others, when first inserted, Node X will not be configured to drop (receive) existing channels from the optical spectrum and will not configured to add (transmit) new channels into the optical spectrum according to regular add/drop functionality of nodes, Network Elements (NEs), routers, switches, optical multiplexers, optical demultiplexers, etc.

General Computing Device

Figure 2:
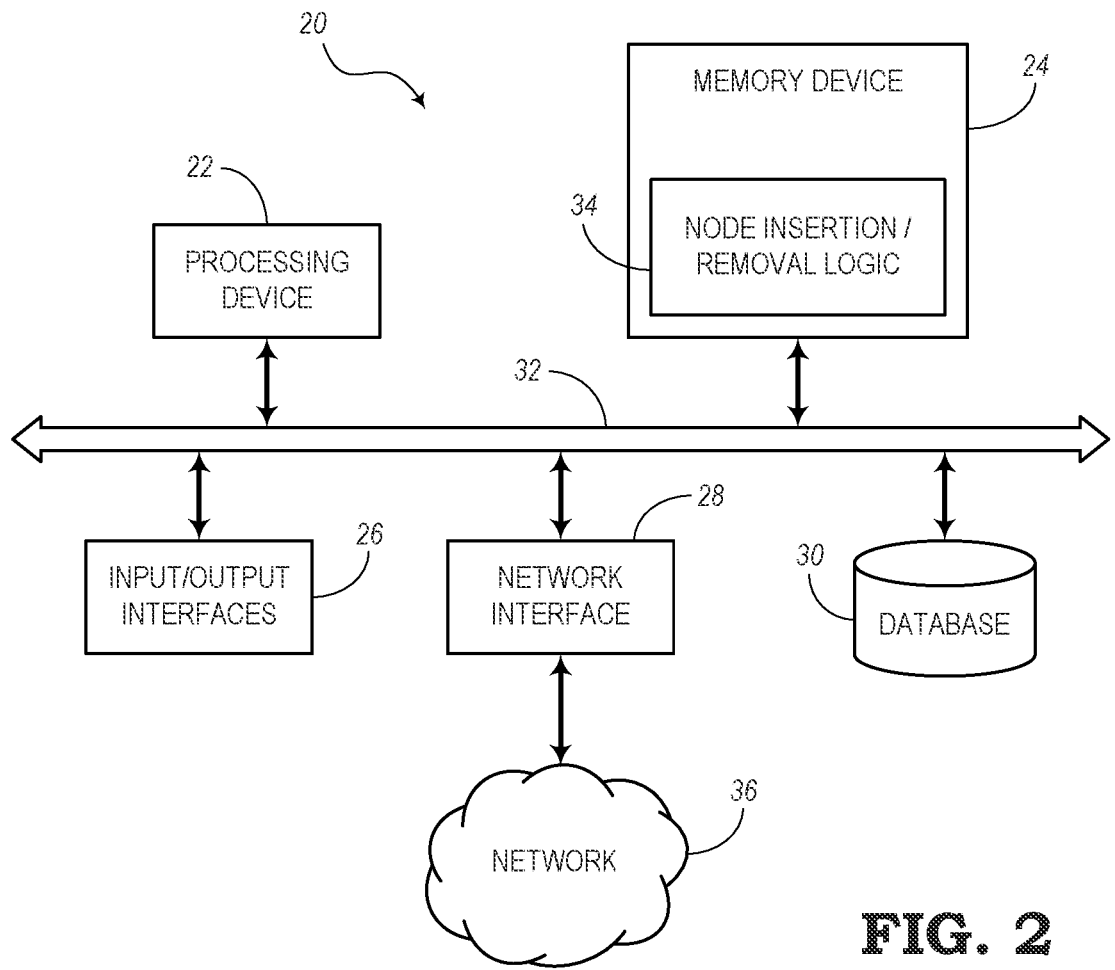
FIG. 2 is a block diagram illustrating a computing device, such as a node of the network of FIG. 1 or controller for controlling the insertion or removal of one or more nodes into or from the network of FIG. 1, according to various embodiments.

FIG. 2 is a block diagram illustrating an embodiment of a computing device 20. For example, the computing device 20 may be a NE, a node, or other suitable optical switching-type device operating in a network (e.g., network 10). According to other embodiments, the computing device 20 may be part of a controller or management device (e.g., Network Management System (NMS), Operations, Administration, and Maintenance (OAM) system, etc.) or other device operating in a control plane of a network. In particular, the computing device 20 is configured to control the procedures (and/or give instructions to a technician) for performing the insertion or removal techniques described in the present disclosure.

For example, some steps may include the actual physical processes, such as a cutting or breaking a fiber, cleaning the ends of the fibers, re-connecting fibers to a new node, disconnecting fibers from the ports of an existing node, re-connecting or patching fibers for forming a direct link between peer nodes, etc. In addition to these physical steps, which can be handled by a technician or engineer, the systems and methods of the present disclosure further include the automated configuration processes, which may not necessarily require a skilled network operator during the initial stage of the insertion/removal process. Of course, once a node has been inserted, the network operator may then configure the node as needed. It may be noted, however, that this set-up process does not need to be rushed, since the new node is initially inserted while in the "pass-through" state and is therefore not affecting traffic flow.

The computing device 20 is configured to control the insertion and/or removal of a node within a network 36 (e.g., network 10 shown in FIG. 1, a campus network, an access network, a metro network, a regional network, a long haul network, etc.). In the illustrated embodiment, the computing device 20 may be a digital computing device that generally includes a processing device 22, a memory device 24, Input/Output (I/O) interfaces 26, a network interface 28, and a database 30. It should be appreciated that FIG. 2 depicts the computing device 20 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the computing device 20 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 24 may incorporate electronic, magnetic, optical, and/or other types of storage media. The memory device 24 may have a distributed architecture, where various components are situated remotely from one another, but can be accessed by the processing device 22.

The memory device 24 may include a data store, database (e.g., database 30), or the like, for storing data. In one example, the data store may be located internal to the computing device 20 and may include, for example, an internal hard drive connected to the local interface 32 in the computing device 20. Additionally, in another embodiment, the data store may be located external to the computing device 20 and may include, for example, an external hard drive connected to the Input/Output (I/O) interfaces 26 (e.g., SCSI or USB connection). In a further embodiment, the data store may be connected to the computing device 20 through a network and may include, for example, a network attached file server.

Software stored in the memory device 24 may include one or more programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 22), or any suitable combination thereof. Software/firmware modules may reside in the memory device 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 28 may be used to enable the computing device 20 to communicate over a network, such as network 10, 36, the Internet, a Wide Area Network (WAN), a Local Area Network (LAN), and the like. The network interface 28 may include, for example, an Ethernet card or adapter (e.g., 10BaseT, Fast Ethernet, Gigabit Ethernet, 10GbE) or a Wireless LAN (WLAN) card or adapter (e.g., 802.11a/b/g/n/ac). The network interface 28 may include address, control, and/or data connections to enable appropriate communications on the network 10, 36.

The computing device 20 further includes node insertion/removal logic 34, which may be implemented in software or firmware and stored in a non-transitory computer-readable medium, such as the memory device 24. The node insertion/removal logic 34 may be implemented in hardware and configured in the processing device 22 (e.g., as an ASIC). In still other embodiments, the node insertion/removal logic 34 may be implemented in any suitable combination of hardware, software, firmware, middleware, etc. in the computing device 20.

For example, the node insertion/removal logic 34 may be configured to enable the processing device 22 to configure a Network Element (NE) in a pass-through mode whereby channels are neither added nor dropped to thereby prepare the NE for insertion into or removal from a photonic network. After the NE is prepared for insertion or removal by the configuring the NE in the pass-through mode, the node insertion/removal logic 34 may be configured to enable the processing device 22 to perform additional steps.

For example, upon the insertion of the NE into the photonic network or the removal of the NE from the photonic network, the processing device 22 may be configured to perform a zero configuration procedure for automatically establishing communication along one or more Optical Service Channels (OSCs). Upon the insertion of the NE into the photonic network or the removal of the NE from the photonic network, the node insertion/removal logic 34 may additionally enable the processing device 22 to perform a zero configuration procedure for automatically controlling gain and loss characteristics along one or more fiber links altered by the insertion or removal.

In some embodiments, a technician may be instructed, either by the node insertion/removal logic 34 or by other means, to a) break a fiber connection between two peer nodes in the photonic network, b) perform the insertion of the NE between the two peer nodes in the photonic network, and c) re-establish the one or more fiber connections with the NE for enabling direct communication between the NE and each of the two peer nodes.

The NE being inserted/removed may be a Reconfigurable Optical Add/Drop Multiplexer (ROADM). In other embodiments, the NE may be a Fixed Optical Add/Drop Multiplexer (FOADM), whereby the pass-through condition may allow one or more channels, which are not already preconfigured for the channel adding operation or the channel dropping operation, to pass signals through with neither the channel adding operation nor the channel dropping operation.

After the step of configuring the NE in the pass-through condition may include preparing the NE for two-degree insertion into or two-degree removal from the photonic network insertion of the NE into the photonic network, the processing device 22 may be configured to provision the NE for adding and/or dropping one or more channels. The node insertion/removal logic 34 may sufficiently support a link budget of channels in the photonic network before and after the insertion of the NE into the photonic network or the removal of the NE from the photonic network.

Node Insertion Process

FIG. 3 is a flow diagram illustrating an embodiment of a process 40 for inserting a node (or NE) into a network (e.g., network 10, 36). The process 40 includes confirming link budget support before and after NE configurations, as indicated in block 42. The process 40 also includes confirming equipment dynamic range support before and after NE configurations, as indicated in block 44. Also, the process 40 includes configuring the node (or NE) to be inserted, as indicated in block 46. Then, the process 40 includes configurating the two designated degrees (e.g., west degree and east degree) for pass-through, as indicated in block 48.

The process 40 also includes instructing a technician to break an existing fiber path and insert the new node using the two designated degrees, as indicated in block 50. Then, the process 40 includes automatically establishing communications between sites (e.g., peer NEs) to allow information exchange, as indicated in block 52. The process 40 also includes automatically establishing photonic control to equalize the path, as indicated in block 54, and re-establishing traffic on the designated pass-through path, as indicated in block 56.

Node Removal Process

FIG. 4 is a flow diagram illustrating an embodiment of a process 60 for removing a node (or NE) from a network. This process 60 includes many of the same (or similar) steps described with respect to FIG. 3. The process 60 includes confirming link budget support before/after NE configurations (block 62) and confirming equipment dynamic range support before/after NE configurations (block 64). At this point, the process 60 may also include configuring the NE in a pass-through state.

The process 60 also includes providing instructions to a technician (or allowing a technician) to break an existing fiber path (or paths), removing the node, and "glass-through" fiber connections (block 66). The process 60 also includes automatically establishing communications between sites to allow information exchange (block 68). Also, the process 60 includes automatically establishing photonic control to equalize the path (block 70) and re-establishing traffic on the designated pass-through path (block 72).

Therefore, methods of the present disclosure are configured to use node-based automation processes in combination to deliver a rapid restoration of pass-through traffic. These methods may be configured to drive requirements into a number of aspects of the node. With respect to photonic path provisioning, the processes of the present disclosure are configured to allow all channels to pass initially, so that the node insert does not change the routing of pre-existing wavelengths. Add/drop traffic may be provisioned at a later time after express traffic is fully restored. However, since the channels are pass-through and do not affect traffic, the provisioning of add/drop functionality does not need to be implemented immediately.

With respect to zero configuration (zero-config) communications, the present disclosure allows nodes in the network to establish site-to-site communications automatically. These site-to-site communications may be required in some cases to support photonic control. Also, with respect to zero configuration photonic control, the network may include a photonic control system to compensate for losses and spectral distortion. The zero-configuration control automatically starts once the neighbor communications channel is established. The embodiments of the present disclosure may allow for almost full automation, which may be configured to minimize the time to restore service and reduce the number of possible errors in the process.

General Outline

I. Pre-requisites
  A. Link budget support
  B. Existing equipment
II. Insertion/Removal Strategy
  A. Configure insert node (for insertion)
  B. Configure default pass-thru (for insertion)
  C. Insert/Remove node
  D. Zero config comms
  E. Zero config control
  F. Traffic established
III. Optional Topology Confirmation

Link Budget Support

One pre-requisite includes checking for proper link budget support. To allow a successful process for rapidly inserting or deleting a node, it may typically be important to confirm that the channels on the system can support the required transmission link budget, both before and after the network change. This confirmation can be achieved in a number of different ways. For example, one way to confirm the proper link budget support is by performing live margin measurements on the system. Also, some tools for predicting link budget can be used before and after the network change. The go/no-go analysis of the insert/removal process may typically be performed offline but may also be integrated into network management systems.

Existing Equipment

Another pre-requisite includes checking that the existing equipment meets certain guidelines. To facilitate an automated process, it may also be important that the equipment that is common (i.e., does not change) between the before and after states will not require physical reconfiguration (for the insertion/deletion). Equipment provisioning can be adjusted during the transition as needed. In some embodiments, the process of confirming that the existing equipment will not need reconfiguration may be similar to the process of confirming the link budget support. Confirming that the existing equipment meet this condition can be achieved in a number of ways. For example, this confirmation may include understanding margin and operating points from the existing equipment. Also, link budget tools may be used to confirm the operating dynamic range. The node insertion/removal may be a constrained activity as this occurs within an existing network, and therefore the before and after conditions can be well predicted.

Configure Insert Node

After any pre-requisites are handled, the general insertion/deletion procedures can be executed. In some embodiments regarding the insertion of a node, a first step may include configuring this node to be inserted. Before this node can be inserted, it should be properly configured to ensure a successful insertion.

Many nodes are often built with multiple elements, such as for node resiliency between directions. Also, the multiple elements may enable the node to have flexible equipment configurations. The node may be "internally" connected and shall be able to confirm its capability. For example, this may include checking that all required equipment is present, all required equipment is connected with appropriate losses, and that connections are complete (e.g., except for lineside connections, local add/drop at insert node, etc.).

By definition, a node insertion/removal process is a two-degree event (e.g., east and west degrees for connection with two peer nodes). For insertion, a technician will need to break (or disconnect) a path (or fiber) and insert the new device, which will only impact the two degrees (directions). Therefore, the two degrees may be identified. After insertion, the newly inserted node, of course, can be configured to support more than two degrees (if necessary), according to the network topology design.

Configure Default Pass-Thru

Another step related just to node insertion is the step of configuring a default pass-through condition for the node (before actual insertion). Having identified the two degrees that are intended to participate in the insertion (according to the previous step), the default pass behavior is established. In some cases, this will be the only two degrees that are initially present. This may be done without any knowledge or provisioning of the specific channels in the network.

Fixed add/drop photonic solutions may be adapted to default to this behavior, where the optical paths are pre-defined by the fixed optics deployed. For example, programmable add/drop photonic solutions (e.g., ROADMs) may be adapted to default to an "all pass" design. Normally, conventional ROADM designs would default to a spectrum "block" behavior, as opposed to the "all pass" described in the present disclosure. Therefore, the embodiments of the present disclosure provide no blocking behavior, but instead allow channels to pass, which is an inversion (reversal) of the conventional behavior.

Note that "all pass" provisioning does not necessarily mean that minimum loss pass through is actuated, but rather that the spectrum will automatically be allowed after the system ramps up control. The default pass-thru provisioning, and confirmation that this is complete may also be a last step of the strategy for preparing for insertion.

Insert/Remove Node

Both the insertion and removal techniques described in the present disclosure may be performed at this point. The previous two steps are related to the insertion technique for preparing the new node to be inserted. In some embodiments, the removal process may include a similar process of configuring an existing node (to be removed) in an all-pass state.

In the insertion case, prior to the node insertion, the new node has been configured, confirmed, and (if required) programmed to allow default express path behavior. The fiber path is broken at the new site. This is typically the separation of optical connectors at a fiber patch panel. The new node is connected in-line at this connection point. One degree may be connected to the "west" side of the system and one degree may be connected to the "east" side of the system. Normal connector cleaning and inspection protocol may be performed at this time as well.

In the removal case, ideally any traffic that was accessed at the node to be removed has already been removed from the path (or the node is configured as all-pass). Traffic may be provisioned (if necessary) to pass through the two designated degrees to be removed. The lineside fibers at the two designated degrees are removed and connected directly together, typically at a patch panel. Normal connector cleaning and inspection protocol may also be expected for this operation.

Zero Configuration Comms

The next step in the insertion/removal process is zero-configuration (zero-config) communications. The photonic equipment may be equipped with zero-config communications channels between equipment sites. This may be an automatically operational service that establishes a communications connection when the fiber path is established between sites during the node insert/removal operation. The comms path may allow communication between adjacent nodes and allow for topology and photonic control information to be exchanged.

An example implementation may include an embedded Optical Service Channel (OSC) that is Wavelength Division Multiplexed (WDM) (e.g., Dense WDM (DWDM), etc.) with the signal transmission frequencies. For example, a 1511 nm OSC signal may provide an Ethernet connection over the same fiber as C-band and/or L-band signals.

Also, communications may be automatically established without requiring provisioning of the far end address and may allow messages to be exchanged. In one example, the system may use IPv6 link local addressing along with IPv6 Neighbor Discovery Protocol to automatically discover and connect to the neighbor host to automatically discover and connect to the neighbor host. Topology and control communications can then be exchanged.

Zero Configuration Control

The next step may include a zero-config control operation. The photonic equipment may be equipped with a zero-config photonic control solution. The photonic control application can automatically calibrate the established connections to determine the optimum equipment provisioning for the (discovered) link. This may involve a number of different automatic calibrations depending upon the specific equipment included. Examples of these may include a) fiber loss measurement, b) fiber length measurement, c) fiber type characterization, d) Optical Time-Domain Reflectometry (OTDR), e) gain characterization of a Raman amplifier, etc. The resultant provisioning may then be configured on the optical equipment in the node.

The zero-config control may be executed on both sides of the inserted equipment. In the removal case, this will be re-established between the subtending nodes. Also, the default pass provisioning of the insertion may allow the traffic to photonically pass through the newly inserted device.

Pass-Thru Traffic Automatically Established

According to the general outline of the insertion/deletion technique shown above, the insertion/deletion strategy may include a last step of automatically establishing pass-through traffic. The default pass configuration on the insert node shall be activated to allow traffic to flow across the two designated degrees. This may be achieved by hardware design (e.g., fixed filters). This may also be achieved by programming an "all-pass" spectrum. This may also be achieved by discovering the spectrum provisioning from the adjacent nodes and implementing this on the new pass-thru node.

In some embodiments, establishing the pass-through traffic may use a "soft" bring-up procedure of the spectrum. The traffic paths may be automatically established without any further user provisioning.

The combination of the above steps allows automated control of the new optical elements to provide rapid restoration of existing services without user interaction (e.g., with the exception of the fiber reconfiguration). The add/drop traffic for the inserted site can then provisioned at a later time as needed.

Automatic Topology Confirmation

After the strategies are performed, as described above, there may be an optional step of automatically confirming the network topology. For example, the photonic nodes may be aware of the far end devices connected and can automatically discover the network topology connections. This can be published at a North Bound Interface (NBI) of the nodes such that a network management system can discover the changes in the line configuration.

Furthermore, an "expected far end address" may be provisioned to all of the nodes. When a "far end mismatch" occurs between the discovered and provisioned far end nodes, the system can raise a mismatch warning. This alarm will confirm to the user that the insertion has been made and the time at which it was achieved. Clearing the alarm can be achieved by re-provisioning the expected far end address to match the discovered address (if correct).

Node Insertion

FIGS. 5A-5E are network diagrams illustrating aspects of a node insertion procedure within a section 80 of a network (e.g., network 10, 36), according to various embodiments. As illustrated, the section 80 includes a link (e.g., link 12-1, 12-2) between Nodes B and C shown in FIG. 1. The section 80 may include a hut X 82, a hut Y 84, and a hut Z 86 arranged on the link between Nodes B and C. For example, the huts 82, 84, 86 may include a structure having equipment housed therein for amplifying signals along the link, for fiber connections, patching, etc. In this example, suppose that a new node (i.e., Node X) is planned to be inserted in place of hut X 82 at the location of hut X 82.

Figure 5A:
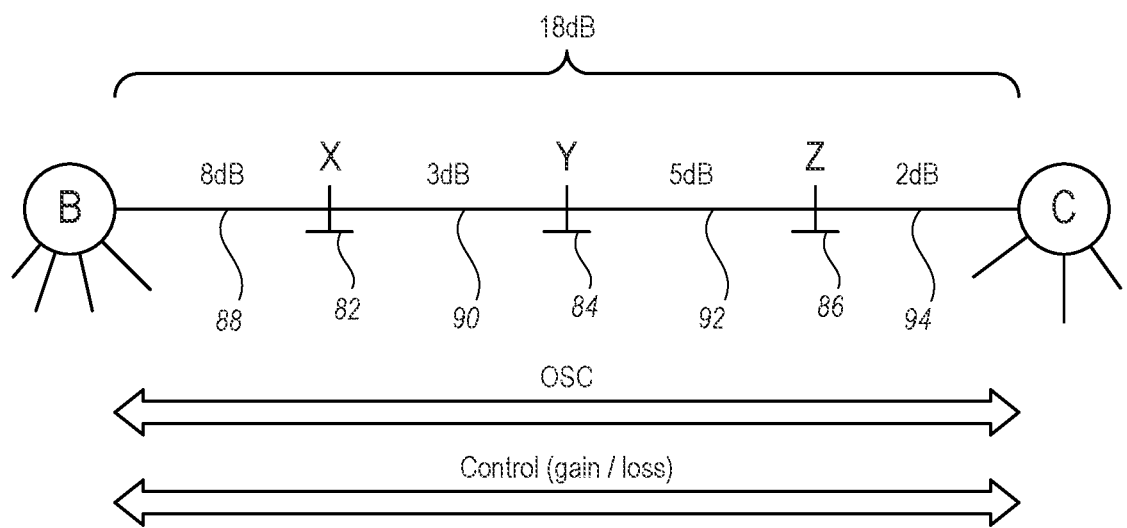
FIGS. 5A-5E are network diagrams illustrating aspects of a node insertion procedure, according to various embodiments.

In FIG. 5A, the link between Nodes B and C may be a 18 dB link, where 8 dB is lost along fiber 88 between Node B and hut X 82, 3 dB is lost along fiber 90 between hut X 82 and hut Y 84, 5 dB is lost along fiber 92 between hut Y 84 and hut Z 86, and 2 dB is lost along fiber 94 between hut Z

86 and Node C. An Optical Service Channel (OSC), in the state shown in FIG. 5A, exists between Nodes B and C.

Figure 5B:
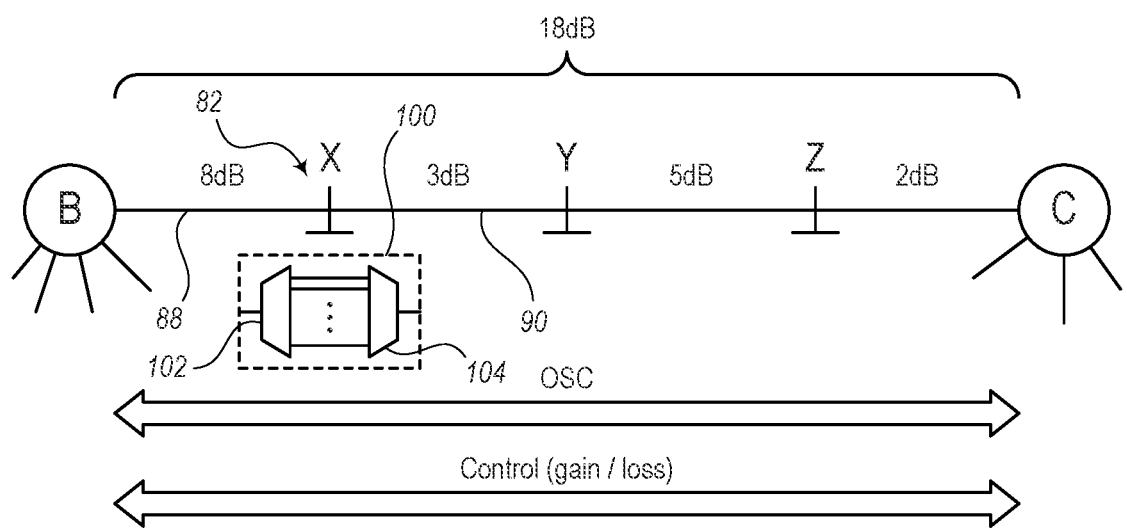

In FIG. 5B, a new node 100 having add/drop capabilities is scheduled to be inserted into the path between Nodes B and C at the location of hut X 82. The node 100, for example, may include, among other things, a demultiplexer 102 and a multiplexer 104 (e.g., for communicating optical signals in the direction from left to right on the page). It should be noted the node 100 may include any suitable arrangement of demultiplexers and multiplexers for communication in either or both directions. Normally, during regular operation, one or more channels may be dropped or removed at the output of the demultiplexer 102 and one or more channels may be added at the input of the multiplexer 104. However, as configured, according to the systems and methods of the present disclosure, the new node 100 is configured in an "all-pass" arrangement where all channels are passed from the outputs of the demultiplexer 102 to the inputs of the multiplexer 104. In addition to configuring the new node 100 in a pass-through (default pass) mode, the processes of the present disclosure may include confirming interconnections and losses. The processes may also include designating the two degrees (e.g., for connection between Nodes B and C).

Figure 5C:
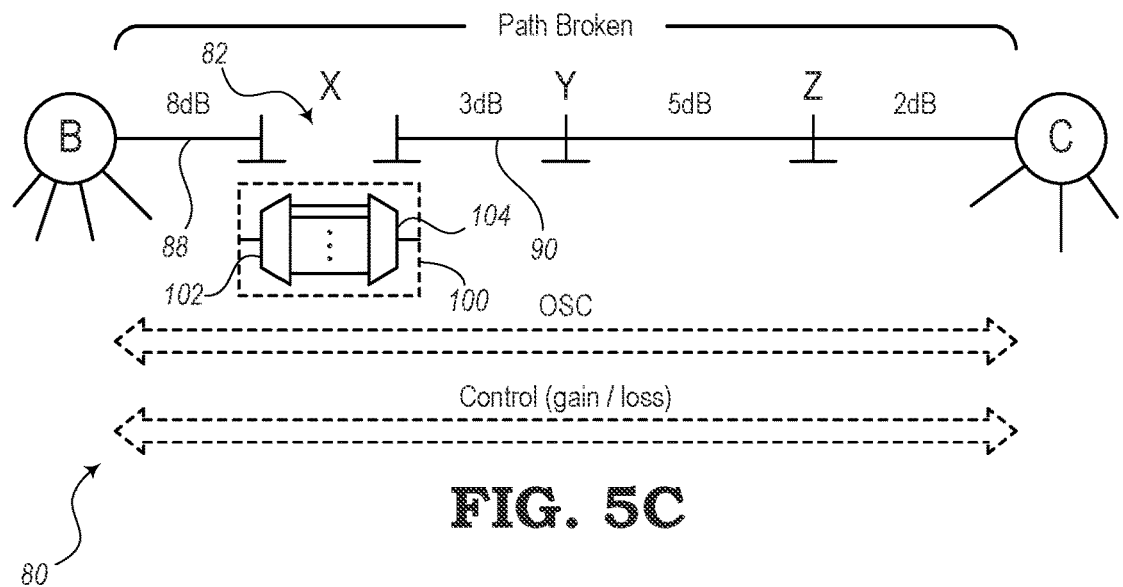

In FIG. 5C, the section 80 is shown where the fiber connection at hut X 82 is broken (i.e., intentionally) to enable the insertion of the new node 100 into the system. Normally, hut X 82 may be arranged in a "glass-through" state to allow optical signals to pass without issue. When the fibers 88, 90 are disconnected from each other, the transmission path is interrupted. At this point, back-up or protection paths (e.g., or other alternative paths, such as is shown in FIG. 1) may be used for recovering from the traffic disruption. Traffic protection at Nodes B and C may either be pre-provisioned or may include an automatic reaction to the fiber break. Also, when fibers 88, 90 are separated (broken), the OSC path and control path are also broken.

Figure 5D:
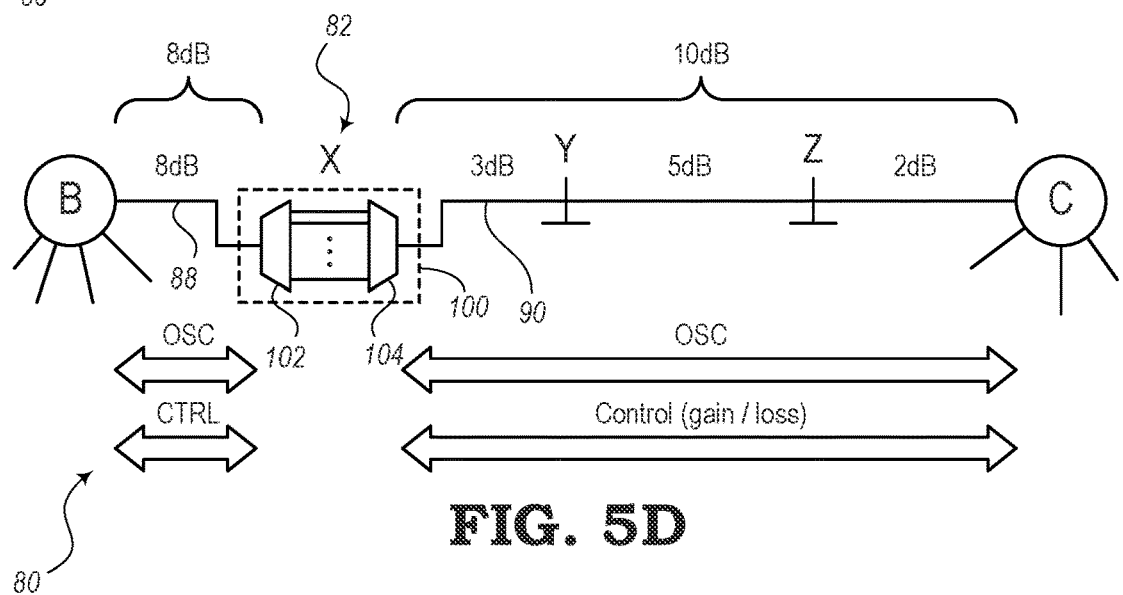

In FIG. 5D, the new node 100 is connected to fiber 88 (e.g., west degree) and fiber 90 (e.g., east degree). Again, it should be noted that the new node 100 is arranged in the pass-through mode whereby the demultiplexer 102 passes all channels to the multiplexer 104 (and vice versa for communication in the opposite direction). The new node 100 is installed in the location where hut X 82 previously existed.

At this point, the OSC and control paths may be automatically re-established (e.g., when configured with zero configuration functionality). A first OSC path is established between Node B and the new node 100 (Node X) and a second OSC path is established between the new node 100 (Node X) and Node C. Likewise, a first control path is established between Node B and Node X and a second control path is established between Node X and Node C. With zero configuration, the OSC and control can start automatically and compensate for gain/loss. For example, it may be determined during automatic provisioning that a first new fiber path (e.g., fiber 88 between Nodes B and X) has a loss of 8 dB and that a second new fiber path (e.g., fibers 90, 92, 94 between Nodes X and C) has a loss of 10 dB.

Default traffic express design is configured to restore connectivity as soon as control converged. Traffic may be re-established in minimum amount of time. For example, add/drop traffic at Node X may be provisioned later (see FIG. 5E). At this point, however, Node X looks like an "invisible" node (or perhaps looks like an Intermediate Line Amplifier (ILA)) with no add/drop operations.

Figure 5E:
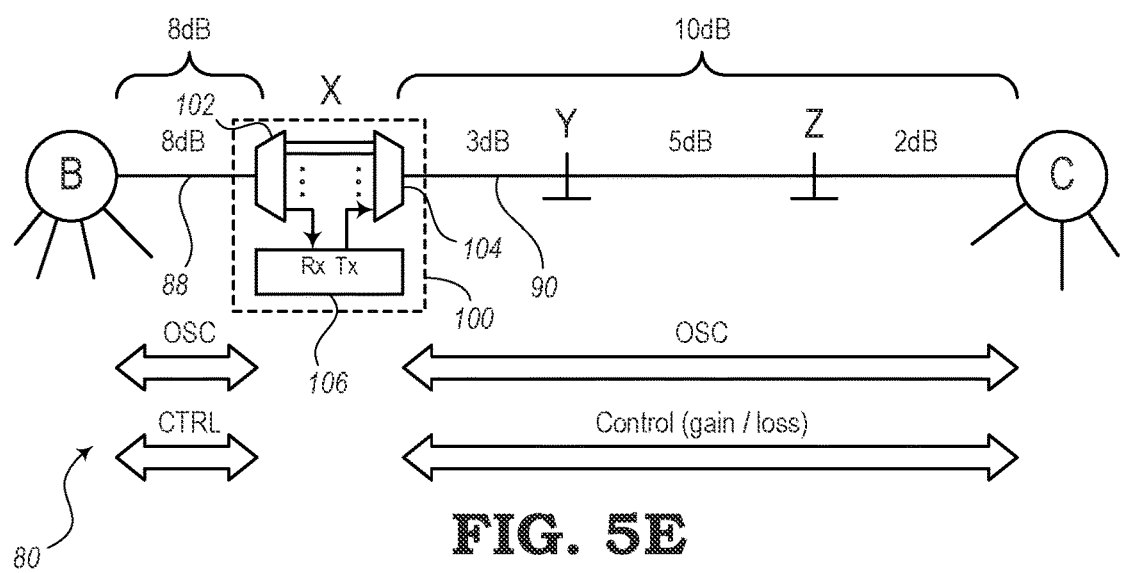

In FIG. 5E, the new node 100 (Node X) is established in the path between Nodes B and C. Also, the new node 100 may include add/drop devices (e.g., receivers Rx, transmitter Tx, etc.) for handling optical channels according to regular node design. Thus, after the pass-through, Node X may be configured at any time by any suitable means to add and/or drop channels as needed. Also, additional degrees may be added to Node X to allow connection with other nodes (e.g., connection with Node F shown in FIG. 1, such as over a new link).

Node Removal

FIGS. 6A-6D are network diagrams illustrating aspects of a node removal procedure within a section 110 of a network (e.g., network 10, 36), according to various embodiments. The section 110 may include fibers 112, 114, 116, 118 connected along a path between Node B and Node C. In this example, suppose an existing node 120 (i.e., Node X) is operating in the section 110 of the network between Nodes B and C. The link between Node X and Node C may include one or more huts (e.g., huts Y and Z).

The existing node 120 (Node X) may include a demultiplexer 122 and a multiplexer 124 for processing signals in a direction from Node B to Node C (shown from left to right on the page). The demultiplexer 122 and multiplexer 124 may include add/drop capabilities and may be connected to add/drop device 126, which may include, among other things, receivers and transmitters. A first set of OSC and control paths are configured between Node B and X and a second set of OSC and control paths are configured between Node X and Node C.

Figure 6A:
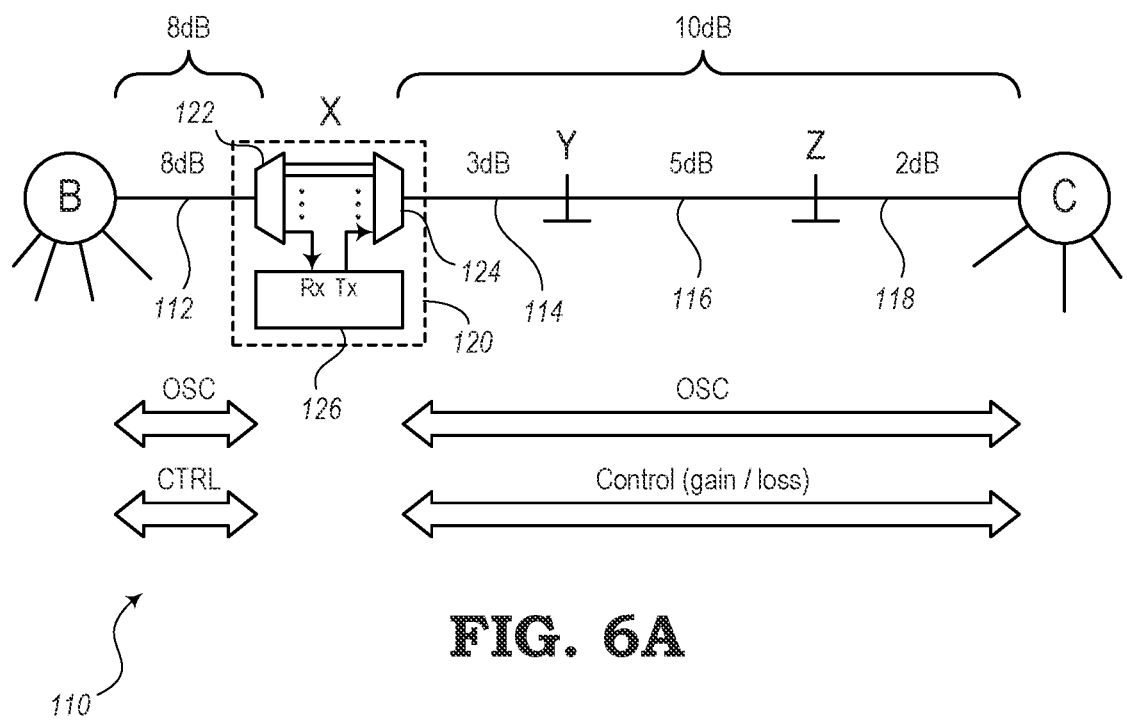
FIGS. 6A-6D are network diagrams illustrating aspects of a node removal procedure, according to various embodiments.

In FIG. 6A, Node X is able to operate in a normal fashion with channel adding and dropping as needed. Suppose, however, that it is determined that Node X is no longer needed in the section 110 and is planned for removal. In this case, Nodes B and C are planned to communicate directly with each other (without Node X).

Figure 6B:
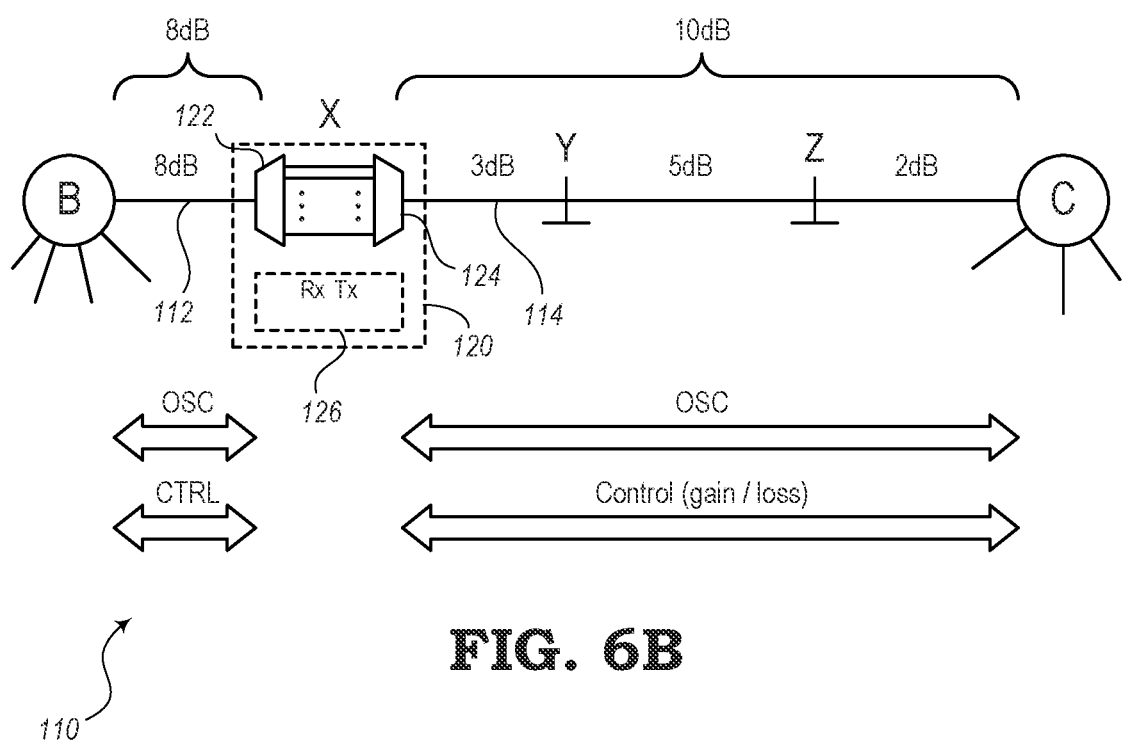

In FIG. 6B, according to some embodiments, Node X may be placed in a pass-through mode where the add/drop device 126 is not used and all channels from the output of the demultiplexer 122 are configured to pass signals along to the input of the multiplexer 124. The decision to remove Node X may also include a decision to convert the old node into a new hut (e.g., hut X). For example, it may be determined during network planning, based on network demand or other factors, that the equipment used at Node X may be better utilized at another location (e.g., at hut Y, hut Z, or somewhere else in the network). In the pass-through mode, Node X is essentially decommissioned and is no longer operating as a normal node. Other decommissioning or de-provisioning procedures may be performed to remove Node X. For example, traffic that would normally be added or dropped at Node X may be re-directed such that other nodes may pick up the responsibilities, either temporarily or permanently (again based on network planning and need).

Figure 6C:
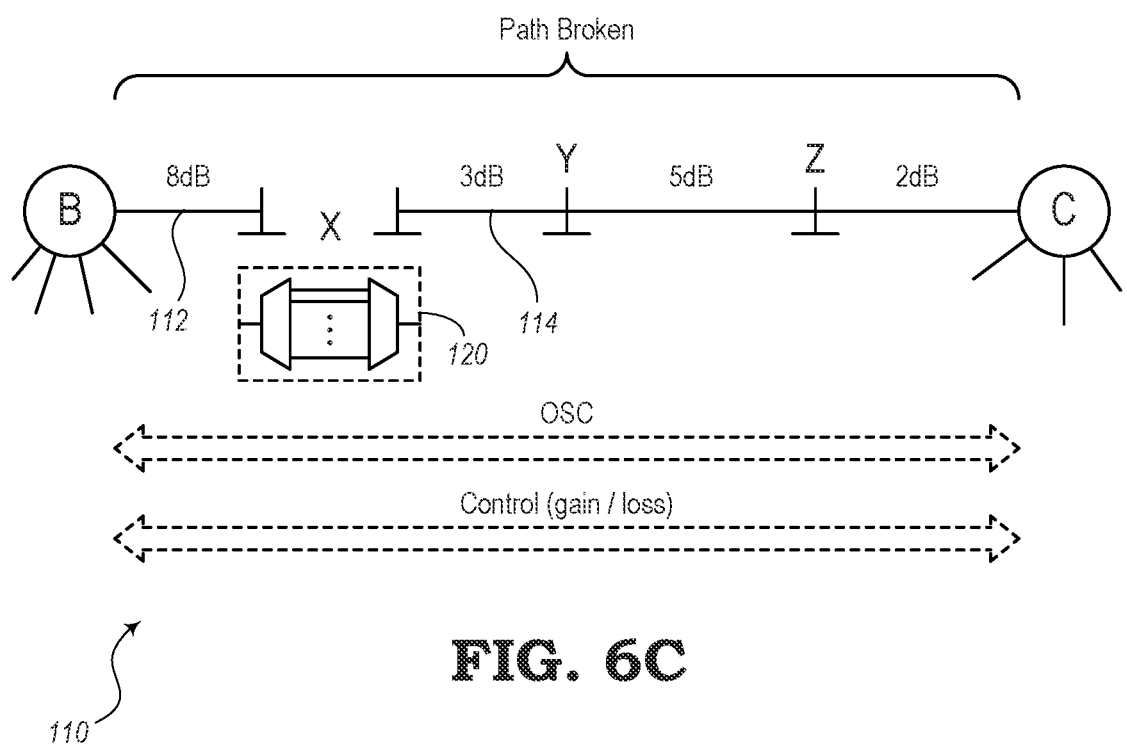

In FIG. 6C, a technician can be deployed to the location of Node X (e.g., existing node 120) to perform certain physical tasks. For example, the technician can be instructed in any suitable manner to break a first connection between fiber 112 and the existing node 120 and break a second connection between fiber 114 and the existing node 120. At this point, the path is broken between Nodes B and C. Traffic can be re-directed to alternative or protections paths (e.g., such as along various paths as shown in FIG. 1) as needed, which may be pre-provisioned or automatically determined. It should also be noted that breaking these connections also includes breaking the OSC and control paths.

Figure 6D:
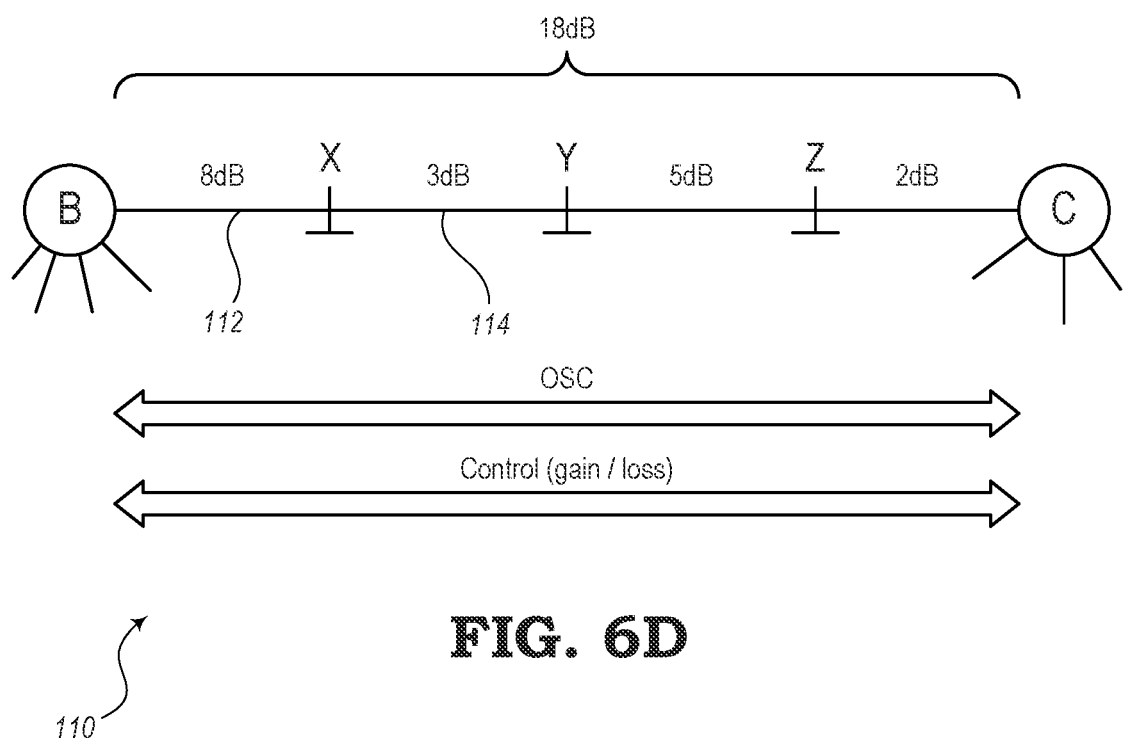

In FIG. 6D, the technician may then be instructed to reconnect the fiber 112 with the fiber 114 for restoring the path between Nodes B and C, which at this point includes a direct path without Node X. The connection of fibers 112, 114 (or reconnection of the link between Nodes B and C) may be considered to be a "glass-through" path. With zero configuration or Zero-Touch Provisioning (ZTP), a new OSC path may be automatically established between Nodes B and C in place of the two previous OSC paths. Also, a new control path may be automatically established between Nodes B and C in place of the two previous control paths. At this point, express traffic is restored. Also, Node X, in some cases, may be re-deployed at another location in the network.

General Process

Figure 7:
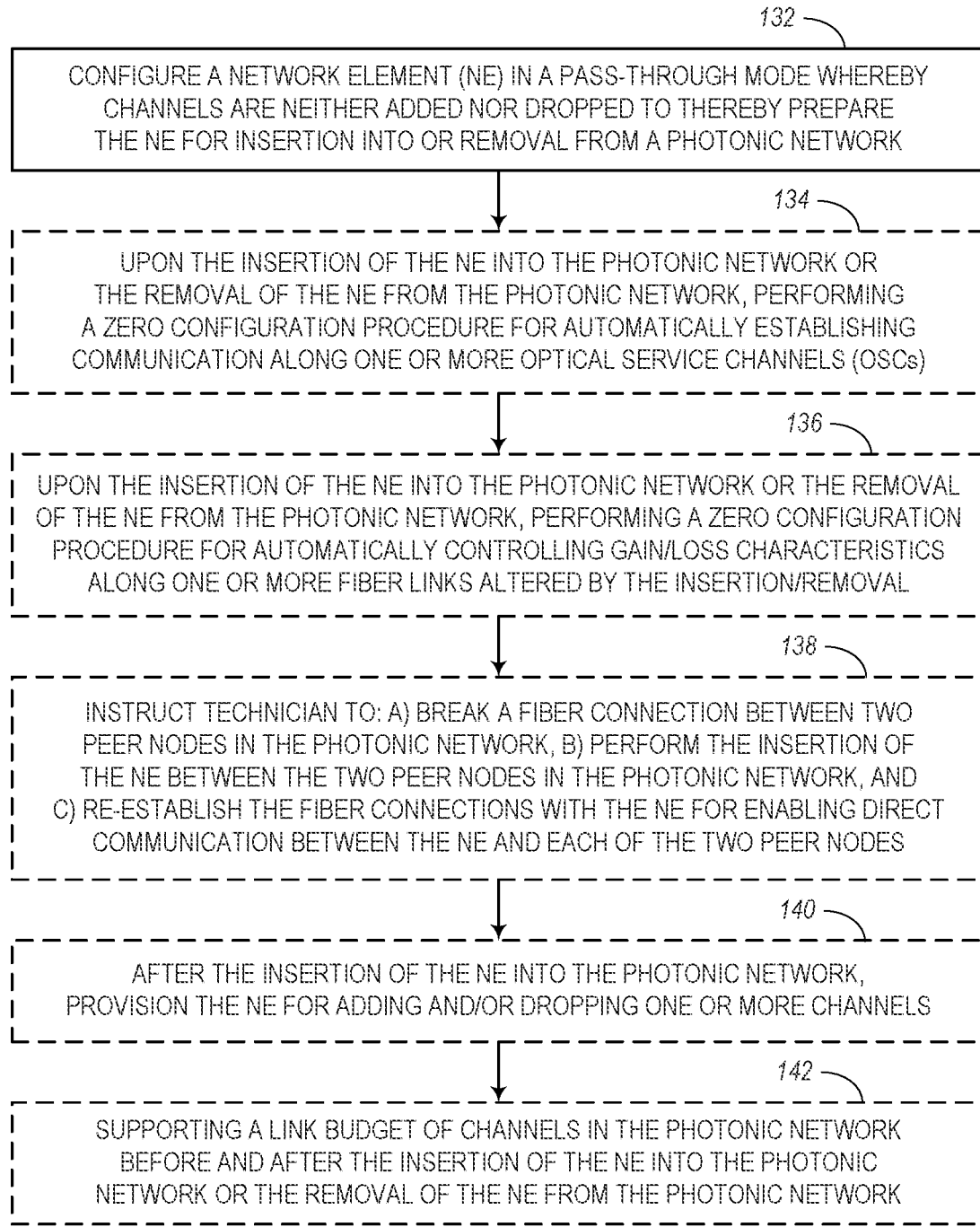
FIG. 7 is a flow diagram illustrating a general process for performing a node insertion or node removal procedure, according to various embodiments.

FIG. 7 is a flow diagram illustrating an embodiment of a general process 130 for performing a node insertion or node removal procedure. For example, the general process 130 may include the step of configuring a Network Element (NE) in a pass-through mode whereby channels are neither added nor dropped to thereby prepare the NE for insertion into or removal from a photonic network, as indicated in block 132. After the NE is prepared for insertion or removal by the configuring the NE in the pass-through mode, additional steps, according to optional implementations, may be performed.

For example, upon the insertion of the NE into the photonic network or the removal of the NE from the photonic network, the process 130 may further include the step of performing a zero configuration procedure for automatically establishing communication along one or more Optical Service Channels (OSCs) (block 134). Upon the insertion of the NE into the photonic network or the removal of the NE from the photonic network, the process 130 may additionally include the step of performing a zero configuration procedure for automatically controlling gain and loss characteristics along one or more fiber links altered by the insertion or removal (block 136).

In some embodiments, the process 130 may include the step, as indicated in block 138, of instructing a technician to a) break a fiber connection between two peer nodes in the photonic network, b) perform the insertion of the NE between the two peer nodes in the photonic network, and c) re-establish the one or more fiber connections with the NE for enabling direct communication between the NE and each of the two peer nodes.

It may be noted that the NE described in the process 130 may be a Reconfigurable Optical Add/Drop Multiplexer (ROADM). In other embodiments, the NE may be a Fixed Optical Add/Drop Multiplexer (FOADM), whereby the pass-through condition may allow one or more channels, which are not already preconfigured for the channel adding operation or the channel dropping operation, to pass signals through with neither the channel adding operation nor the channel dropping operation.

After the insertion of the NE into the photonic network, the process 130, according to some embodiments, may further include the step of provisioning the NE for adding and/or dropping one or more channels. The step of configuring the NE in the pass-through condition may include preparing the NE for two-degree insertion into or two-degree removal from the photonic network. Also, the process 130 may further include the step of sufficiently supporting a link budget of channels in the photonic network before and after the insertion of the NE into the photonic network or the removal of the NE from the photonic network.

Therefore, the systems and methods of the present disclosure configure a node or NE in a pass-through mode before it is inserted into or removed from a network. This provides some benefits over the conventional strategies for node insertion and removal. Conventional strategies normally default to an "all-block" configuration, which is the opposite of the embodiments of the present disclosure. During a node insertion process according to conventional methods, the user (or other software entity) can provision services to establish an optical path through the node. Although this may provide for a stable, general purpose solution, it also creates delays and complexity in the bring-up procedure. However, the embodiments described in the present disclosure overcome these shortcomings by recognizing that a node insert/removal is a topologically constrained event that deals with two degrees in the network. By declaring these two degrees participating in the insertion process, the optical paths can be pre-configured to an "all-pass" mode, allowing service to be restored without any explicit provisioning or knowledge of the existing provisioning in the network.

Also, the embodiments of the present disclosure may preferably operate in a system having zero-config or zero-provisioning implementation. On the other hand, many conventional networks require that IP addresses are provisioned before communications can be established between their neighbors or peers. However, the methods of the present disclosure are adapted to leverage zero-configuration methods (e.g., IPv6 link local mode with IPV6 Neighbor Discovery Protocol) to automatically establish communication to an attached node without the need for explicit provisioning. This allows rapid and error free communications to the (new) neighbor. This method allows full automation of the control communications systems.

With zero configuration photonic control, many conventional systems require that the photonic control system is calibrated, configured, and manually started in the network. On the other hand, the embodiments of the present disclosure automatically starts once the neighbor/peer communications are established. This allows for the rapid and error-free compensation for the physical losses and distortion in the network to be automatically compensated. Also, this re-establishes traffic in the shortest possible time with minimal risk of error. The combination of these elements allows for a rapid insertion/removal process with minimal user intervention.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a processing device, and
   a memory device configured to store a computer program having instructions that, when executed, enable the processing device to configure a Network Element (NE) in a pass-through mode whereby channels are neither added nor dropped to thereby prepare the NE for insertion into or removal from a photonic network, and to check for sufficient link budget support of channels in the photonic network before and after the insertion of the NE into the photonic network or the removal of the NE from the photonic network.

2. The system of claim 1, wherein, upon the insertion of the NE into the photonic network or the removal of the NE from the photonic network, the instructions further enable the processing device to perform a zero configuration procedure for automatically establishing communication along one or more Optical Service Channels (OSCs).

3. The system of claim 1, wherein, upon the insertion of the NE into the photonic network or the removal of the NE from the photonic network, the instructions further enable the processing device to perform a zero configuration procedure for automatically controlling gain and loss characteristics along one or more fiber links altered by the insertion or removal.

4. The system of claim 1, wherein the processing device is configured to instruct a technician to:
  break a fiber connection between two peer nodes in the photonic network,
  perform the insertion of the NE between the two peer nodes in the photonic network, and
  re-establish the one or more fiber connections with the NE for enabling direct communication between the NE and each of the two peer nodes.

5. The system of claim 1, wherein the NE is a Reconfigurable Optical Add/Drop Multiplexer (ROADM).

6. The system of claim 1, wherein the NE is a Fixed Optical Add/Drop Multiplexer (FOADM), and wherein the pass-through condition allows one or more channels, which are not already preconfigured for the channel adding operation or the channel dropping operation, to pass signals through with neither the channel adding operation nor the channel dropping operation.

7. The system of claim 1, wherein, after the insertion of the NE into the photonic network, the instructions further enable the processing device to provision the NE for adding and/or dropping one or more channels.

8. The system of claim 1, wherein configuring the NE in the pass-through condition includes preparing the NE for two-degree insertion into or two-degree removal from the photonic network.

9. A non-transitory computer-readable medium configured to store computer logic having instructions that, when executed, cause one or more processing devices to configure a Network Element (NE) in a pass-through mode whereby channels are neither added nor dropped to thereby prepare the NE for insertion into or removal from a photonic network, and to check for sufficient link budget support of channels in the photonic network before and after the insertion of the NE into the photonic network or the removal of the NE from the photonic network.

10. The non-transitory computer-readable medium of claim 9, wherein, upon the insertion of the NE into the photonic network or the removal of the NE from the photonic network, the instructions further cause the one or more processing devices to perform a zero configuration procedure for automatically establishing communication along one or more Optical Service Channels (OSCs).

11. The non-transitory computer-readable medium of claim 9, wherein, upon the insertion of the NE into the photonic network or the removal of the NE from the photonic network, the instructions further cause the one or more processing devices to perform a zero configuration procedure for automatically controlling gain and loss characteristics along one or more fiber links altered by the insertion or removal.

12. A method comprising the step of configuring a Network Element (NE) in a pass-through mode whereby channels are neither added nor dropped to thereby prepare the NE for insertion into or removal from a photonic network and the step of checking for sufficient link budget support of channels in the photonic network before and after the insertion of the NE into the photonic network or the removal of the NE from the photonic network.

13. The method of claim 12, wherein, upon the insertion of the NE into the photonic network or the removal of the NE from the photonic network, the method further comprises the step of performing a zero configuration procedure for automatically establishing communication along one or more Optical Service Channels (OSCs).

14. The method of claim 12, wherein, upon the insertion of the NE into the photonic network or the removal of the NE from the photonic network, the method further comprises the step of performing a zero configuration procedure for automatically controlling gain and loss characteristics along one or more fiber links altered by the insertion or removal.

15. The method of claim 12, further comprising the step of instructing a technician to:
  break a fiber connection between two peer nodes in the photonic network,
  perform the insertion of the NE between the two peer nodes in the photonic network, and
  re-establish the one or more fiber connections with the NE for enabling direct communication between the NE and each of the two peer nodes.

16. The method of claim 12, wherein the NE is a Reconfigurable Optical Add/Drop Multiplexer (ROADM).

17. The method of claim 12, wherein the NE is a Fixed Optical Add/Drop Multiplexer (FOADM), and wherein the pass-through condition allows one or more channels, which are not already preconfigured for the channel adding operation or the channel dropping operation, to pass signals through with neither the channel adding operation nor the channel dropping operation.

18. The method of claim 12, wherein, after the insertion of the NE into the photonic network, the method further comprises the step of provisioning the NE for adding and/or dropping one or more channels.

19. The method of claim 12, wherein configuring the NE in the pass-through condition includes preparing the NE for two-degree insertion into or two-degree removal from the photonic network.

* * * * *